Aug. 27, 1963 A. CHIAPUZIO, JR., ETAL 3,102,191

SEQUENCE VERIFICATION APPARATUS

Filed Feb. 26, 1958 4 Sheets-Sheet 1

INVENTORS.
ANTON CHIAPUZIO, Jr.
GLENN H. SHAW
BY
Allan Rothenberg
ATTORNEY

INVENTORS.
ANTON CHIAPUZIO, Jr.
GLENN H. SHAW
BY
Allan Rothenberg
ATTORNEY

SEQUENCE VERIFICATION APPARATUS

Filed Feb. 26, 1958 4 Sheets-Sheet 3

INVENTORS.
ANTON CHIAPUZIO, Jr.
GLENN H. SHAW
BY
Allan Rothenberg
ATTORNEY

INVENTORS.
ANTON CHIAPUZIO, Jr.
GLENN H. SHAW
BY
Allan Rothenberg
ATTORNEY

United States Patent Office 3,102,191
Patented Aug. 27, 1963

3,102,191
SEQUENCE VERIFICATION APPARATUS

Anton Chiapuzio, Jr., Downey, and Glenn H. Shaw, East Whittier, Calif., assignors to North American Aviation, Inc.

Filed Feb. 26, 1958, Ser. No. 717,713
8 Claims. (Cl. 235—61.7)

This invention relates to sequence verification apparatus and, more particularly, to apparatus for comparing identifying indicia of information bearing records in order to verify a desired relation between such records.

In a data handling apparatus various operations such as, for example, the feeding of input information to the apparatus must take place in a predetermined sequence. For this and other purposes, it is desirable that certain bodies of information be in a known physical or time sequence relation and that an indication of such relation be provided. Thus, information bearing records such as punched cards are frequently provided with identifying indicia or tag numbers to enable sequence verification. In some apparatus relatively complex arrangements have been proposed to determine relative superiority or inferiority of tag numbers. The indication provided by such verification is not always easily handled.

The most efficient and straightforward sequence comparison may be obtained by the use of simple coincidence detectors. It has been suggested that each record or card be provided with its own tag number together with the tag number of the card next in order. Then, the first number of one card is compared for coincidence with a second number of the next card for sequence verification. Such an arrangement, however, requires an undue increase in required programming and, furthermore, utilizes an increased amount of the available card storage area which is, of course, limited.

It is accordingly an object of this invention to enable coincidence detection of sequence with a minimum of programming and identifying indicia.

In accordance with the present invention each of two numbers to be compared is read. One of the numbers so read is then changed by a value equal to the desired difference between the two numbers. The changed number and the other of the two numbers are then fed to a simple coincidence detecting circuit which will provide an indication of the equality of the two inputs thereto.

In a disclosed embodiment of the invention a series of punched cards bearing identifying tag numbers in numerical sequence are fed in order through first and second sensing stations which together read the tag numbers of each pair of successive cards. A single unit is added to the number N of the card in the second sensing station to provide the number $N+1$ which is fed to a coincidence detector together with the unchanged number $N+1$ of the card read by the first sensing station. Thus, any discontinuity in the output of the coincidence detector will indicate departure from the desired numerical card sequence.

An object of this invention is to enable comparison of two numbers by effecting equalization thereof.

Another object of the invention is the equalization of two numbers for coincidence comparison.

Still another object of the invention is to insure that a series of test cards will pass through a card programmer in a numerical sequence.

A further object of the invention is coincidence comparison of coded decimal numbers.

These and other objects of the invention will become apparent from the following description taken in connection with the accompanying drawings, in which.

Throughout the drawings like reference numerals refer to like parts.

Figure 1:
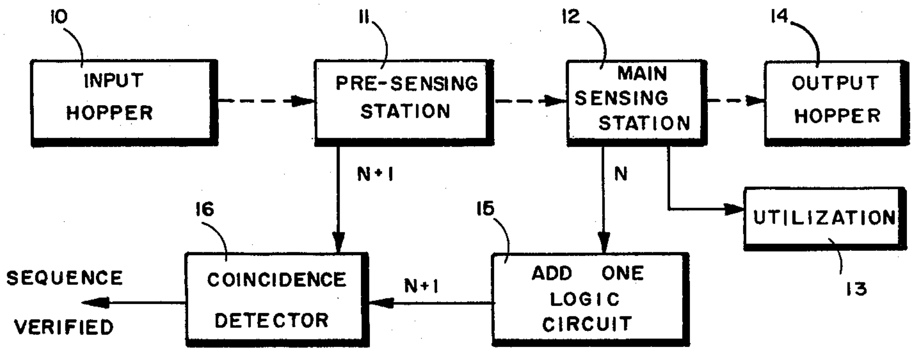
FIG. 1 is a functional diagram of the sequence verification apparatus of this invention.

As illustrated in FIG. 1, standard punched card handling apparatus such as that manufactured and sold by Remington Rand and IBM may include an input hopper 10 into which a plurality of program or other information bearing cards are placed and stacked to be withdrawn one by one in the order of their physical arrangement or stacking. Each card is withdrawn and fed to a presensing station 11 where it may be momentarily stopped as in Remington Rand equipment to allow the sensing fingers of the card reader to sense the positions of the punched holes. The card from the presensing station 11 is then fed to a main sensing station 12 which may be identical to the station 11 where it is again momentarily stopped to allow the card reading. As one card is fed from station 11 to station 12 a second card is fed from the input hopper 10 to the station 11 so that the two stations may simultaneously read the two consecutively supplied cards in unison. The reading of the cards is conveniently performed in any of a number of ways of which one may comprise the closing of relay switches by those of the sensing fingers which are positioned over holes in the card. The holes are thus converted into electrical indications for use as the application may demand. Thus, the relays closed by either one or both of the sensing stations 11 and 12 may supply binary electrical signals to utilization circuitry broadly indicated as the block 13. From the main sensing station 12 or any additional sensing stations that may be utilized, the cards are fed into and collected in an output hopper 14.

The nature and details of the utilization circuit 13 comprise no part of this invention although one possible application of the invention may be for use in a punched card programmed automatic checkout equipment. In such equipment the program cards may control and direct the testing of a large number of components of apparatus such as, for example, an autopilot or fire control system and provide, by means of an output printer, a record of the tests made and the results thereof.

In order to insure the passing of the cards to the main sensing station 12 in proper order, the tag number (expressed by the hole pattern of a selected area of the card) of the card in station 12 at any time is compared with the tag number of the card in the presensing station 11 at such time. The comparison is effected by providing equalization of the tag numbers of the cards being compared whereby coincidence of the equalized numbers may be indicated by a coincidence detector. For equalization of the numbers to be compared it is merely necessary to know the desired difference between the numbers and then to change either one of the numbers by the amount of this known difference. Obviously, it is possible, though less desirable, to change both tag numbers to effect equalization. In accordance with the disclosed embodiment where the cards are to be handled in increasing numerical sequence the known difference between tag numbers of successive cards is decimal one. Thus, the value decimal one may be either added to the number read by the main sensing station 12 or subtracted from the number read by the presensing station 11. The former is illustrated. The reader of sensing station 12 feeds the number N to the add one logic circuit 15 which provides as its output a signal indicative of the number $N+1$ which is, of course, the tag number of the card of next succeeding numerical order. A signal indicative of the number $N+1$ derived from the reader of presensing station 11 and a signal indicative of the number derived from the add one logic circuit 15 are both fed to coincidence detector 16 which may be arranged to provide any suitable output indication of proper card sequence. For example, the coincidence detector may be arranged to provide a continuous output signal during proper sequencing which is fed to the card programmer. Thus, a discontinuity in the output of the coincidence detector indicating lack of proper card sequence may be fed to the card feeding mechanism to stop the operation thereof.

Figure 2:
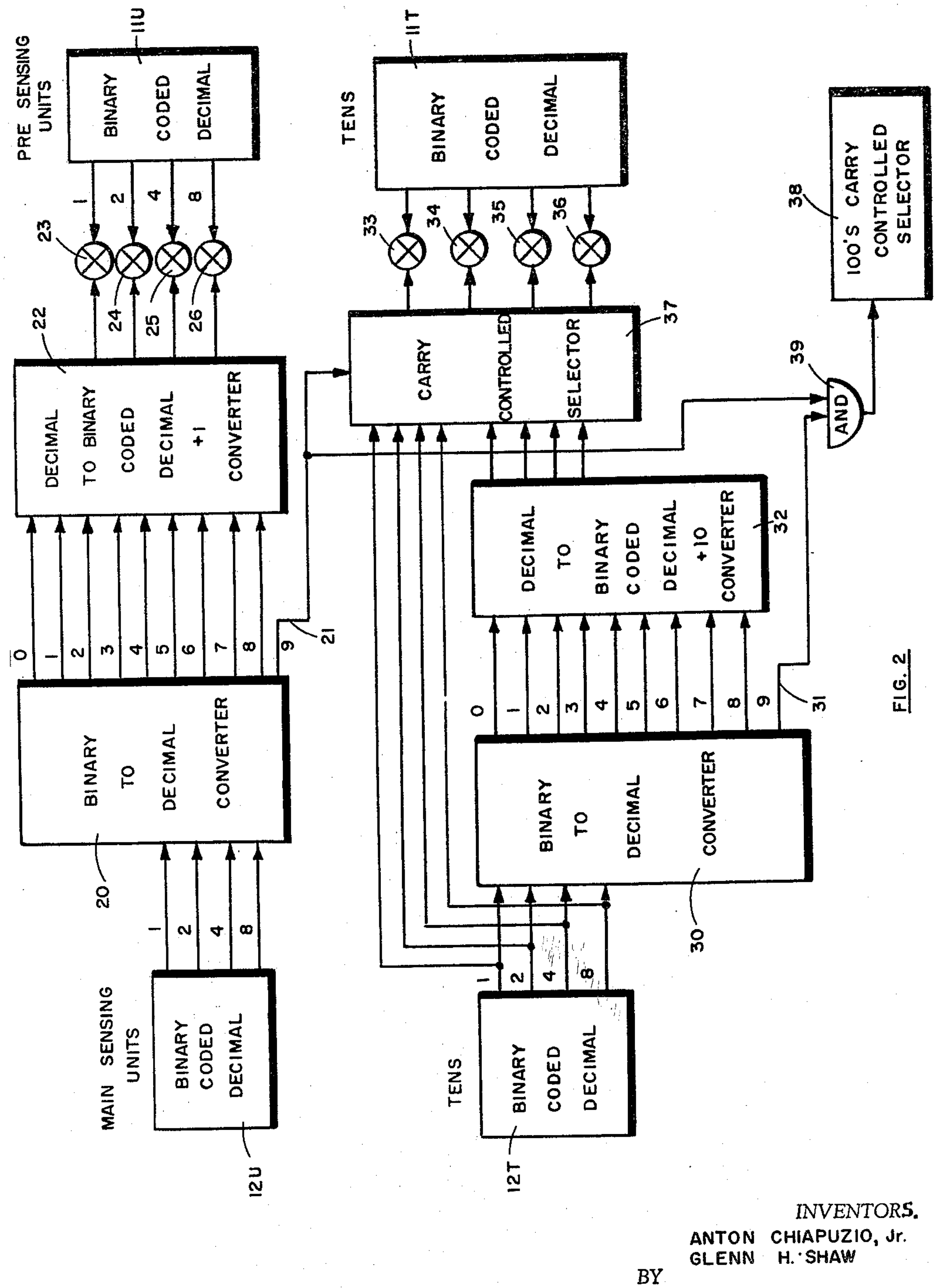
FIG. 2 is a block diagram of the invention as applied for comparison of binary coded decimal numbers.

Indicated in FIG. 2 is a block diagram of an exemplary mechanization of the invention as applied to a system wherein the tag numbers are expressed in binary coded decimal form. In a punched card system, of course, all indicia must be expressed in binary form although it will be readily appreciated that the principles of this invention are not limited to either a punched card data handling system or to any record system carrying information expressed in binary form. The principles of the invention may equally well be applied to record media other than punched cards such as, for instance, a magnetic tape, disk or drum carrying magnetically recorded digital data. Analog data may also be utilized with suitable provision for analog to digital conversion. Optical or photo-electric punched tape or card readers may, of course, be utilized in the place of mechanical readers. In the apparatus utilizing binary coded decimal data each order of the tag number will be expressed by four binary digits. Therefore, in order to handle cards up to one thousand in number three channels of succesively higher order (units, tens and hundreds) will be provided from the readers. Thus, as indicated in FIG. 2, there will be a units reader 12U and a tens reader 12T in the main sensing station 12. A third order reader, not shown, will also be provided. Likewise, the presensing station will have a units reader 11U, a tens reader 11T and a hundreds reader, not shown. The units reader 12U, sensing the units order of the binary coded decimal tag number of the card in the main sensing station, will provide outputs on some combination of its four output leads identified in the drawing by the decimal value assigned to the particular leads. Thus, for example, as is well-known, an output on the lead having a value of two and the lead having the value of four indicates decimal six. The outputs of the reader 12U are fed to a binary to decimal converter 20 having ten output leads each designated in the drawing by the decimal value assigned thereto. The output lead 21 of decimal value nine is the carry output lead of converter 20 since for the purposes of equalization in the present invention a carry to the next higher or tens order is desired at decimal value nine. The decimal value nine after the equalization provided by adding one is, of course, the decimal value 10 which as usual provides the carry signal. The first nine outputs (0–8) of converter 20 of least significance are fed to a second converter 22 which converts the decimal number indicated by that one of the input leads thereto which is energized to that number changed by a predetermined value and expressed in the original radix 2. The output of converter 20, of course, is the number read by reader 12U and expressed in radix 10. Thus, converter 22 will provide by means of its four output leads a binary coded decimal indication of the units order of the number read by the units channel reader 12U as changed by the addition of the value decimal one thereto. The outputs of converter 22 are individually fed to coincidence detectors 23 through 26 respectively which are arranged to each receive as its other input one output of the units order channel reader 11U which reads the units order of the binary coded decimal tag number of the card in the presensing station 11. Thus, if the binary coded decimal number read by presensing units reader 11U is decimal one greater than the binary coded decimal number read by main units reader 12U each of coincidence detectors 23 through 26 will indicate coincidence of the inputs thereto to thus signify the proper numerical sequence of the two tag numbers being read.

The tens channel (and all succeeding higher order channels, not shown) may be basically similar to the above described units channel. As indicated, the tens channel includes a main sensing binary coded decimal reader 12T having four outputs applied as the inputs to a tens binary to decimal converter 30 which provides ten decimal indicating outputs including carry output 31. The decimal indicating output terminals of converter 30 are applied to the decimal to binary coded decimal +10 converter 32 which may be similar to converter 22 and, likewise, provides a binary coded decimal output at its four output terminals. Just as in the first order channel the tens order reader 11T of the presensing station provides binary coded decimal output at its four output terminals which are respectively applied to coincidence detectors 33 through 36. It will be noted, however, that for equalization of card tag numbers in numerical sequence the number of one of the cards is to be changed by decimal one. Thus, the converter 32 of the tens channel will be necessary only when the units order of the number being read is decimal nine. For this reason there is interposed between the second inputs of the coincidence detectors 33 through 36 a carry controlled selector 37 which is arranged to feed to the coincidence detectors 33 through 36 either the number as read by the tens reader 12T or the tens order number with carry added (+10). The carry output terminal 21 of the units order channel is connected to control the operation of selector 37 so that the output or outputs of reader 12T are fed directly to detectors 33 through 36 for any units order decimal value of zero through eight inclusive. For units order decimal value of nine of the tag number of the card in the main sensing station a signal appears upon carry output terminal 21 which operates to effect transfer of the output of converter 32 to the detectors 33 through 36. It will be seen, therefore, that for any tag number having a units order value of eight or less the units order is augmented by decimal one and the tens order remains unchanged during transfer to the coincidence detectors. For any tag number having a units order decimal value of nine the tens order is augmented while a zero is indicated in the units order transfer to the detectors by the complete absence of an output from the decimal to binary coded decimal converter 22.

It will be readily appreciated that while only two channels of units and tens order are disclosed, for comparing or verifying sequence of cards numbering more than one hundred additional higher order channels may be provided as desired. Each such third order and higher order channel will be identical to the described tens order channel and each will have a carry controlled selector 38 similar in structure, function and operation to the carry controlled selector 37. The only difference necessary will be an AND gate such as indicated at 39 for a third order channel which is required by reason of the fact that augmenting of such third order channel must occur only when the highest digit output (carry output) of all of the channels of lower order occur. For example, an augmentation of the third order channel will occur only for a decimal number such as 199, 299, 399, etc. In such a situation the third order is augmented from one-to-two or two-to-three or three-to-four, etc., while each of the units and tens order channels provides zero output to the respective detectors.

Figure 3A:
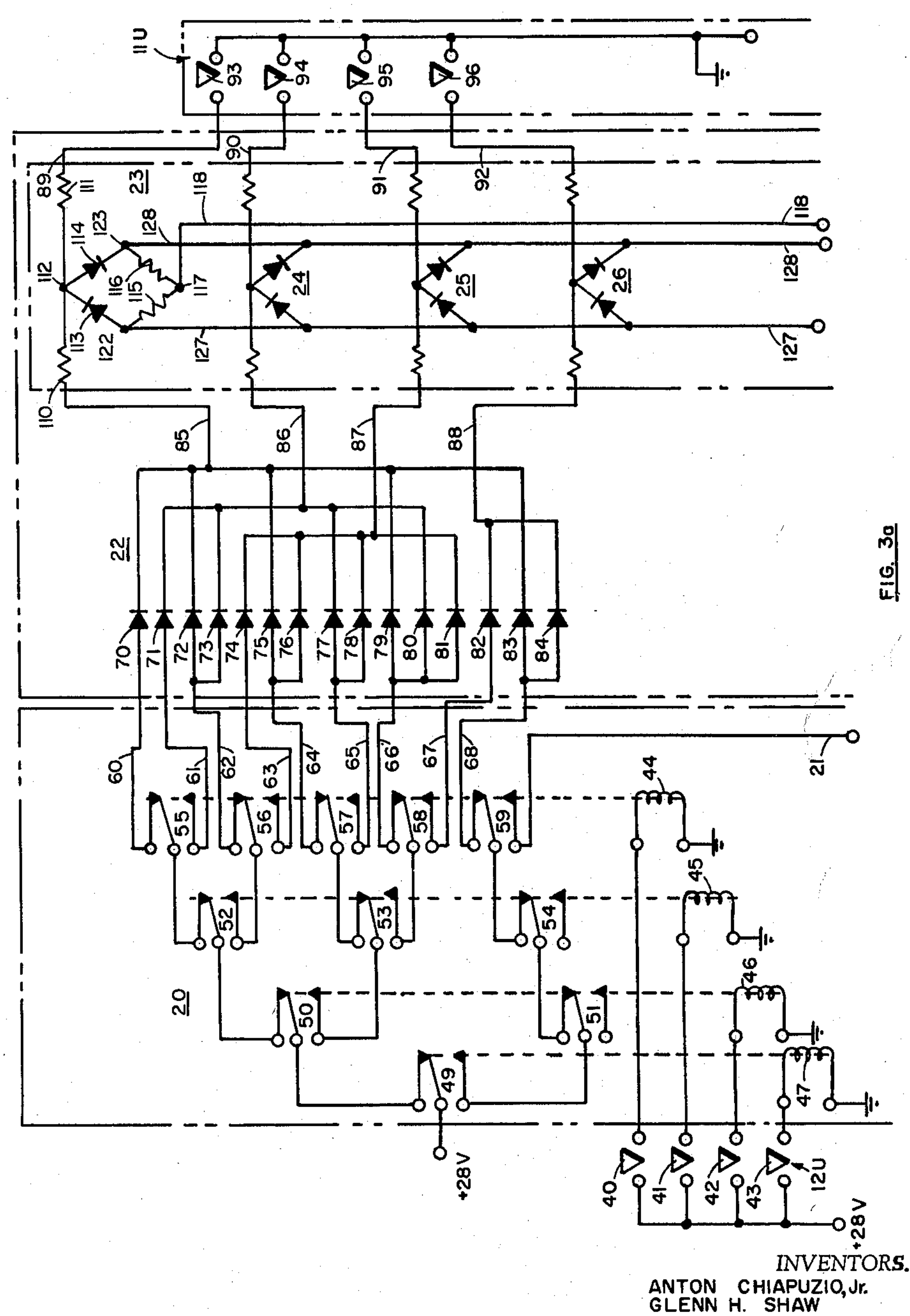
FIGS. 3*a* and 3*b* together illustrate the circuitry of the apparatus of FIG. 2.
Figure 3B:
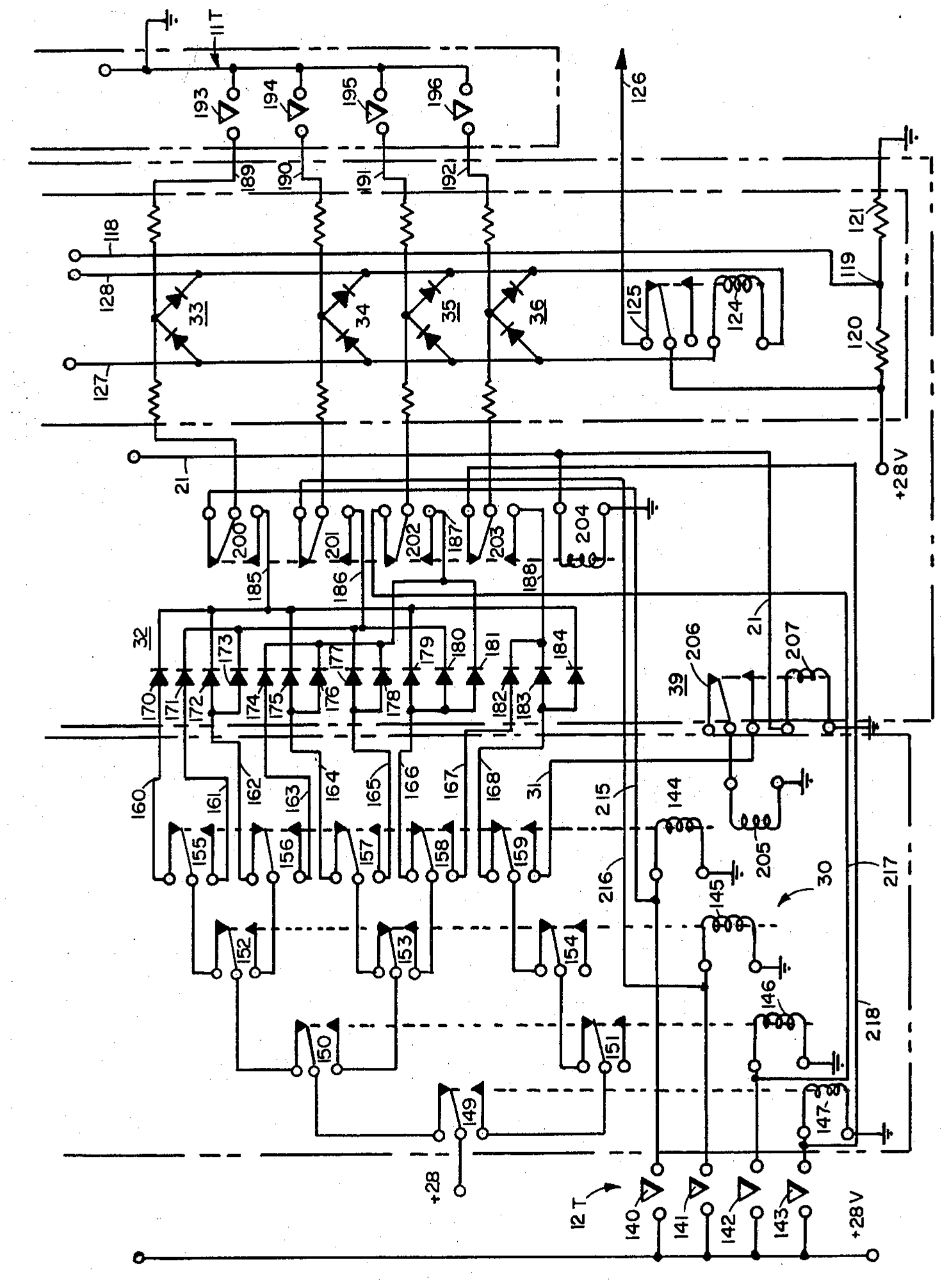

A circuit diagram of the apparatus of FIG. 2 is illustrated in FIGS. 3*a* and 3*b* wherein the main sensing station reader 12U (FIG. 3*a*) is indicated as a plurality of switches 40 through 43 inclusive which are operated by the reading of the sensed number or, more particularly, by the sensing fingers of the reader. One contact of each of switches 40 through 43 is connected in common to a source of fixed potential such as positive 28 volts while the other end of the switches are respectively connected to the operating coils 44, 45, 46 and 47 of relays of the units decoding relay tree or binary to decimal converter 20. The relay tree of converter 20 comprises a plurality of double throw switches including 49 operated by coil 47; 50 and 51 operated by coil 46; 52, 53 and 54 operated by coil 45; 55, 56, 57, 58 and 59 operated by coil 44. The switches 50 through 59 are connected as shown to a source of fixed potential such as plus 28 volts to provide decimal indicating output terminals 60, 61, 62, 63, 64, 65, 66, 67 and 68 and units carry output terminal 21. The leads 60 through 68 inclusive are fed to the decimal to binary coded decimal +1 converter 22 which comprises a plurality of diodes 70 through 84 inclusive having the inputs and outputs connected, as shown, to provide a binary coded decimal +1 indication at the four output terminals 85, 86, 87 and 88 thereof.

As an example of the operation of the several converters assume the units order of the tag number of the main sensing station card is decimal three whereby binary coded switches 40 and 41 will be closed to energized relays 44 and 45 and throw switches 52 through 59 from the normal positions thereof (illustrated) to the other position. A circuit is completed from the voltage supply through switches 49 and 50 (unoperated) and thence through operated switches 52 and 56 to provide a positive voltage upon terminal 63 of converter 20. Terminal 63 has been assigned a value indicative of decimal three. The positive voltage on lead 63 is fed through diode 74 to the output terminal 87 of the decimal to binary coded decimal +1 converter 22. Thus, a positive signal will appear at terminal 87 in binary form indicative of the decimal four value assigned to terminal 87 when the reader 12U reads a tag number of units order value of decimal three. In other words the number sensed by the reader 12U has been augmented by decimal one.

At this point it may be noted that the use of the relay tree for the binary to decimal converter 20 is desirable since the outputs of the relay tree may be required to drive a printer which may record the numbers read. The relay tree provides a convenient way of obtaining the required printer drive power. Additionally, it is here noted that the double conversion from binary coded decimal to decimal and then back to binary coded decimal provides an unexpected simplification of the add one logic which is simply wired into the circuit by connecting the several diodes 70 through 84 as shown. While it is, of course, possible to change the number indicated in binary code which appears at the output of the reader, it is noted that the add one operation in such a case would require the handling of all four binary coded output leads which collectively indicate the decimal value. After conversion to decimal, on the other hand, there is only one lead at any one time which indicates the decimal value and the add one logic is thus greatly simplified.

The signals on output leads 85 through 88 of converter 22 respectively comprise one input to coincidence detectors 23 through 26 which have the second inputs thereof provided respectively by leads 89, 90, 91 and 92 which are coupled through the switches 93, 94, 95 and 96 of the binary coded decimal units reader of the presensing station. As in the main sensing station, the appearance of a hole beneath a sensing finger operates to close the switch individual thereto whereby a binary indication of the tag number of the card in the presensing station will appear on leads 89 through 92 inclusive. There is provided one coincidence detector for each binary order of each pair of readers. Thus, coincidence detector 23 is provided to indicate coincidence of binary zero read by reader 12U and binary one read by reader 11U. Each of the coincidence detectors is identical to all of the others and comprises a first voltage divider having resistors 110 and 111 connected respectively to leads 85 and 89 at one end of each and connected at point 112 to each other and to the cathode and anode respectively of diodes 113 and 114 forming two arms of a bridge including resistive arms 115 and 116. Point 112 provides a first input to the diode bridge circuit while a second input at point 117 is provided via lead 118 by an intermediate point 119 (FIG. 3*b*) of a second voltage divider comprising resistors 120 and 121 each having one end connected in common to point 119 and the other end connected to opposite sides of a voltage supply such as +28 volts and ground respectively. The output of bridge detector 23 is provided at terminals 122 and 123 comprising the junction of diode 113 with resistor 115 and the junction of diode 114 with resistor 116. Typically, resistors 110 and 111 may be 150 ohms each, resistors 115 and 116 may be 1500 ohms each, while resistors 120 and 121 may be 75 ohms each. Across the detector output terminals 122 and 123, via leads 127, 128, is connected a coil 124 (FIG. 3*b*) which is normally de-energized since when both leads 85 and 89 are plus and ground respectively (presence of a signal on both leads) or when both lead 85 and lead 90 are floating (absence of a signal on both leads) there will be no voltage across output terminals 122 and 123. If lead 85 is positive and lead 89 floating or if 85 is floating and lead 89 is ground a voltage of the same polarity no matter which of these latter two conditions exist will appear between terminals 122 and 123 and thus across the coil 124 whereby a set of relay contacts 125 will be operated to indicate lack of coincidence. The contacts of the switch 125 are connected to normally couple a fixed voltage source to the output terminal 126 of the verification apparatus whereby the absence of a positive signal at lead 126 (which absence occurs upon energization of coil 124 in response to improper card sequence) will cause any suitable signal or operation such as, for example, stopping of the card feeding.

Each of the coincidence detectors 24, 25 and 26 is similar in structure and operation to the detector 23. It is noted that the lower two arms of the diode bridge comprise, for all of the detectors shown, the same resistors 115 and 116 which actually are coupled in common in each bridge circuit. For example, the terminal 117 provides a common second input terminal to all of the bridges. Terminal 122 is an output terminal common to all of the bridges by virtue of the lead 127 which connects the anodes of all bridge diodes corresponding to diode 113 together and to one end of coil 124. Similarly, terminal 123 is an output terminal common to all bridges since lead 128 connects one end of resistor 116 to the cathodes of all of the diodes corresponding to diode 114 and to the other terminal of coil 124. Thus, it will be seen that only total coincidence of the input pair to all of the detectors will prevent operation of coil 124. Conversely, lack of coincidence of any input pair of any order will cause operation of coil 124 and provide a discontinuity at output terminal 126.

The tens channel (FIG. 3*b*) is substantially similar to the units channel described above and includes the main sensing station tens reader 12T which operates binary coded decimal switches 140, 141, 142 and 143 which are connected to energize coils 144, 145, 146 and 147 of the tens decoding relay tree 30 comprising relay switches 149–159. The tens binary to decimal converter or decoding tree 30 has decimal indicating output terminals 160–168 inclusive and including carry output terminal 31. The decimal indicating terminals 160–168 are again coupled to the decimal to binary coded decimal +10 converter 32 comprising diodes 170 through 184 inclusive connected as shown. The converter 32 provides at its four output terminals 185, 186, 187 and 188 a binary coded decimal output which in this case is fed to one input terminal of each of switches 200, 201, 202 and 203 respectively which are connected to be simultaneously operated upon energization of the carry selector operating coil 204. The second input terminal of each of carry selector switches 200–203 is derived directly from leads 215, 216, 217 and 218 respectively which are directly connected to the respective switches 140 through 143. The control or carry selector coil 204 is connected to carry terminal 21 of the units order binary to decimal converter 20 so that a carry will be effected upon the appearance of a decimal nine at the units order main station reader. Normally the coil 204 is de-energized and switches 200 through 203 are in the position illustrated to directly connect reader switches 140 through 143 to coincidence detectors 33, 34, 35 and 36 respectively which have the second inputs thereof connected by means of leads 189, 190, 191 and 192 to switches 193, 194, 195 and 196 of the tens order reader 11T of the presensing station. Thus, the coincidence detectors 33 through 36 normally (in the absence of a units order carry) will compare the tens order of the two sensed tag numbers without change of either. Upon the appearance of a carry signal at units order terminal 21 coil 204 is energized to throw switches 200 through 203 to the other position thereof to couple the carry augmented output on terminals 185 through 188 of converter 32 to coincidence detectors 33 through 36.

For a third channel, not shown, which will be identical to the described tens channel there will also be a carry controlled selector having a selector operating coil 205 completely analogous to the tens order selector operating coil 204. In the third order channel, however, the selector operating coil 205 must be operated in response to coincidence of both the units and tens carry as indicated by a positive signal on both of leads 21 and 31. Thus, there is provided an AND gate 39 comprising a normally open switch 206 interposed between carry terminal 31 and coil 205 and actuated to closed position by energization of a coil 207 connected between ground and the units order carry terminal 21.

It will be seen that the above described apparatus provides for efficient and simplified verification of any predetermined or desired difference between two numbers by simply equalizing the two numbers and detecting or indicating coincidence therebetween. While the described embodiment is adapted to verify the sequence of records to be utilized in numerical sequence, it will be readily appreciated that any other predetermined or preselected or selectable difference between the numbers of successive records may be utilized. Every *n*th card may be compared by simply changing one of the card numbers by *n*. The described embodiment is particularly adapted for parallel reading such as is done in Remington Rand equipment wherein all card holes are read in parallel. For use with IBM data handling equipment wherein all card columns are read in parallel and the rows are read sequentially, the tag numbers may all be stored in a single row the columns of which are all read in parallel. For use in a situation where the tag numbers are to be read sequentially the digits of the tag number may be sequentially read directly into temporary storage registers which will be interposed between the several readers and will have parallel outputs to the several conversion and comparison networks disclosed.

Although the invention has been described and illustrated in detail, it is to be clearly understood that the same is by way of illustration and example only and is not to be taken by way of limitation, the spirit and scope of this invention being limited only by the terms of the appended claims.

We claim:

1. Sequence verification apparatus comprising first and second sensing means for respectively reading first and second binary coded decimal numbers, first converter means responsive to said first sensing means for converting said first number to a verification number in decimal form which differs from said first number by a predetermined number, second converter means responsive to said first converter means for converting said verification number to binary coded decimal form, and comparison means coupled with said second sensing means and said second converter means for manifesting quantitative coincidence of said second and verification numbers.

2. Sequence verification apparatus comprising first sensing means for reading a first binary coded decimal number, a binary to decimal converter coupled with said sensing means and having a plurality of decimal indicating output terminals, decimal to binary converter means coupled with said decimal indicating terminals for providing a binary coded decimal output indicative of a number which differs from said first number by a predetermined number; second sensing means for reading a second binary coded decimal number and having a binary coded decimal output; and a quantitative coincidence detector connected to receive the output of said second sensing means and the output of said decimal to binary converter.

3. Sequence verification apparatus comprising first units sensing means for reading the units order of a first binary coded decimal number, a binary to decimal converter coupled with said sensing means and having a plurality of decimal indicating output terminals and a carry output terminal, decimal to binary converter means coupled with said decimal indicating terminals for providing a units order output indicative of a number which differs from said first number by one unit; first tens sensing means for reading the tens order of said first number, a second binary to decimal converter coupled with said tens sensing means having a plurality of decimal indicating output terminals, tens decimal to binary converter means coupled with said tens decimal indicating terminals for providing a tens order output indicative of a number which differs from the tens order of said first number by ten; carry controlled selector means having a control input terminal coupled with said carry output terminal and having inputs from said tens sensing means and said tens decimal to binary converter for providing a tens output indicative of either the output of said tens decimal to binary converter or said tens sensing means as determined by said carry output of said first named converter; second units and tens sensing means for respectively reading the units and tens order of a second binary coded decimal number; a units quantitative coincidence detector connected to receive the output of said second units sensing means and said units order output of said first named decimal to binary converter; and a tens quantitative coincidence detector connected to receive the output of said second tens sensing means and said tens output of said selector means.

4. Sequence verification apparatus comprising means for reading a pair of numbers one of which is expressed in a first radix, a converter coupled with said reading means for changing said one number by a predetermined amount and for converting the radix of said changed number to a second radix, and comparison means coupled with said reading means and said converter for manifesting the quantitative relation between changed number and the other of said pair of numbers.

5. Sequence verification apparatus comprising means for reading a pair of numbers expressed in a first radix, a first converter coupled with said reading means for converting the radix of one of said numbers to a second radix, a second converter coupled with said first converter for changing said one number of said second radix by a predetermined amount and converting said changed number to said first radix, and coincidence detecting means coupled with said reading means and said second converter for manifesting quantitative coincidence of said changed number of first radix and the other of said pair of numbers.

6. Sequence verification apparatus comprising first and second readers for respectively sensing each of a pair of numbers to be compared, converter means coupled to said first reader for changing the number sensed thereby by a predetermined amount, said converter means having a carry output indicative of the highest digit of each order of said changed number, a quantitative coincidence detector having a pair of inputs of which one is coupled with said second reader, selector means for selectively coupling the first reader or said converter to the other input of said detector, and means responsive to said carry output for controlling said selector means.

7. Sequence verification apparatus comprising a plurality of channels each individual to one order of each of a pair of numbers to be compared; each channel comprising first and second readers for respectively sensing corresponding orders of said numbers, converter means coupled to said first reader for changing the number sensed thereby by a predetermined amount, said converter means having a carry output indicative of the highest digit of the order individual thereto, and a quantitative coincidence detector having a pair of inputs of which one is coupled with said second reader; means for coupling the lowest order channel converter means to the other input of the lowest order channel detector; selector means in each channel other than said lowest order channel for alternatively coupling the first reader and the converter of the individual channel to the other input of the individual channel detector; and means in each channel responsive to the carry output of all channels of lower order for controlling the selector means of the individual channels.

8. Sequence verification apparatus comprising:

first sensing means for reading a first binary number;

a binary-to-decimal converter coupled with said sensing means and having a plurality of decimal indicating output terminals;

decimal to binary converter means coupled with said decimal indicating terminals for providing a binary output indicative of a number which differs from said first number by a predetermined number;

second sensing means for reading a second binary number and having a binary output;

and a quantitative coincidence detector connected to receive the output of said second sensing means and the output of said decimal-to-binary converter.

References Cited in the file of this patent

UNITED STATES PATENTS

| | | |
|---|---|---|
| 2,781,971 | Knutsen | Feb. 19, 1957 |
| 2,794,965 | Yost | June 4, 1957 |
| 2,856,595 | Selmer | Oct. 14, 1958 |